United States Patent [19]

Chung

[11] Patent Number: 4,551,828
[45] Date of Patent: Nov. 5, 1985

[54] QUADRILAYER OPTICAL DRAW MEDIUM

[75] Inventor: Chi H. Chung, San Jose, Calif.

[73] Assignee: Minnesota Mining and Manufacturing Company, St. Paul, Minn.

[21] Appl. No.: 476,503

[22] Filed: Mar. 18, 1983

[51] Int. Cl.[4] ............................................... G11B 7/00
[52] U.S. Cl. .................................... 369/275; 369/286; 369/288; 346/135.1
[58] Field of Search ............... 369/275, 284, 286, 288; 346/766, 135.1, 137

[56] References Cited

U.S. PATENT DOCUMENTS

| | | | |
|---|---|---|---|
| 4,195,313 | 3/1980 | Bell et al. | 179/100.1 G |
| 4,216,501 | 8/1980 | Bell | 358/128.5 |
| 4,285,056 | 8/1981 | Bell | 369/100 |
| 4,300,227 | 11/1981 | Bell | 369/84 |
| 4,451,914 | 5/1984 | La Budde | 369/275 |

OTHER PUBLICATIONS

"Optical Disk Systems Emerge", by Bartolini et al., IEEE Spectrum, vol. 15, No. 8, Aug. 1978, pp. 20-28.
"Optical Recording with the Encapsulated Titanium Trilayer", by Bell et al., RCA Review, vol. 40, Sep. 1979, pp. 345-362.

*Primary Examiner*—Alan Faber
*Attorney, Agent, or Firm*—Donald M. Sell; James A. Smith; William B. Barte

[57] ABSTRACT

Quadrilayer optical DRAW medium which differs from prior trilayer optical DRAW media by having a thin triggering layer adjacent each of the optical spacer and light-absorbing layers. The triggering layer is a material, preferably organic, which when heated by a modulated laser-diode beam to a temperature less than the melting point of the optical spacer layer develops substantial vapor pressure or otherwise rapidly expands to implement or enhance the formation of pits or bubbles in the light-absorbing layer without disturbing the optical spacer layer or its function of protecting the substrate of the medium.

15 Claims, 4 Drawing Figures

QUADRILAYER OPTICAL DRAW MEDIUM

TECHNICAL FIELD

The invention relates to an optical recording medium which is recordable by a focused, modulated light beam, such as a light beam from a laser. The medium has a light-absorbing layer which absorbs energy from the light beam to create discrete features such as pits or bubbles which represent information. Since that information is immediately available for optical playback, the medium is called an optical DRAW (Direct-Read-After-Write) medium.

BACKGROUND ART

A preferred optical DRAW medium has a trilayer construction comprising a reflecting layer on an optically-flat substrate, an optical spacer layer overlying the reflecting layer, and a light-absorbing layer overlying the optical spacer layer. If the substrate itself is reflective, it may serve as the reflecting layer. A trilayer optical DRAW medium is schematically illustrated at FIG. 7 on page 26 of "Optical Disk Systems Emerge", by Bartolini et al., IEEE Spectrum, Vol. 15, No. 8, August 1978, pages 20–28. Its layers and their thicknesses are chosen to minimize wasteful reflections and to maximize the absorption of the focused light beam at the light-absorbing layer which in the illustration is titanium but may instead be an organic dye.

U.S. Pat. No. 4,216,501 (Bell) says that the light-absorbing layer should be selected for high absorptivity and long-term stability, suggesting materials such as titanium or rhodium. It suggests that the optical spacer layer should be selected both for transparency and for protecting the reflective surface from oxidation, and should be a dielectric material such as silicon dioxide.

U.S. Pat. No. 4,285,056 (Bell) suggests that if the material of the optical spacer layer melts at a temperature at least 300° C. less than the melting point of the material of the light-absorbing layer, a trilayer optical DRAW medium would provide a much higher signal-to-noise ratio. Two mechanisms are illustrated. In one, heat from the focused, modulated light beam is said to cause the optical spacer material to decompose, sublime or otherwise experience rapidly increasing vapor pressure, and the pressure of the trapped gases can cause a bubble to form in the light-absorbing layer. In the other mechanism, the optical spacer material is said to melt along with the material of the light-absorbing layer, thus causing the material in both layers to draw up around the edge of the hole or pit created. Magnesium fluoride and lead fluoride are said to be useful for the optical spacer layer.

U.S. Pat. No. 4,300,227 (Bell) concerns a trilayer optical DRAW medium having a high-melting light-absorbing layer such as titanium and an optical spacer layer which is an organic material that melts at least 300° C. less than the light-absorbing layer material. This is said to lead to a factor of about two or more reduction in the threshold recording power as compared to a medium having an inorganic optical spacer such as silicon dioxide or magnesium fluoride.

Although the trilayer optical DRAW media discussed above are effective for use with argon laser and helium/neon laser recording systems, they are not as satisfactory for recording systems based on the laser diode which is the currently preferred light source, being much less expensive, having low power requirements, and providing very fast modulation speeds. Laser diodes typically emit within the range of 700 to 900 nm.

Whatever the laser and whether or not the discontinuities are pits or bubbles, the ultimate objective is to create features such that when the recorded information is played back after prolonged storage, the reproduced signals are essentially identical to the recorded signals, as evidenced by high signal-to-noise or carrier-to-noise (C/N) ratios.

A trilayer optical DRAW medium may have additional layers such as an adhesion-promoting subbing layer or a transparent protective surface layer, but because only three layers are involved in creating pits or bubbles, the medium is nevertheless called "trilayer".

DISCLOSURE OF INVENTION

The present invention concerns a laser-recordable optical DRAW medium which like the trilayer media discussed above comprises an optically-smooth reflective substrate, an optical spacer layer overlying the reflective substrate, and a light-absorbing layer overlying the optical spacer layer. As in some prior optical DRAW media, the optical spacer layer of the present invention preferably has a melting point of at least 1800° K. The optical DRAW medium of the present invention differs from those of the prior art, being quadrilayer in that it includes a triggering layer adjacent to each of the light-absorbing and optical spacer layers, which triggering layer has a thickness less than that of the optical spacer layer and when heated to a temperature below the melting point of the optical spacer layers experiences rapidly increasing vapor pressure which implements or enhances the formation of a bubble or pit in the light-absorbing layer. The triggering layer develops substantial vapor pressure or otherwise rapidly expands when heated to a temperature less than the melting point of the optical spacer layer so that a pit or bubble can be formed without disturbing the optical spacer layer and the protection it provides for the reflective layer.

Preferably the triggering layer material is an organo or organo-metallic material which has a low activation temperature (for example 200° C.) to enhance the recording sensitivity. A preferred range of activation temperatures is 200° to 500° C. This makes it more feasible the use of a low-power laser-diode recording system.

Whether bubbles or pits are created in the light-absorbing layer of the novel quadrilayer DRAW medium is primarily determined by the recording power level and pulse duration. At the relatively low recording power levels intended to produce bubbles, minor accidental variations in the recording power level can result in variations in bubble shapes or in occasional holes forming in the bubbles, with resultant decreased C/N ratios. On the other hand, such variations are relatively inconsequential at the higher power levels at which pits are formed, so that it usually is preferred to operate at a power level which forms pits. The novel quadrilayer DRAW medium can be so sensitive that only pits are formed at recording power levels used in the prior art to form bubbles.

As in the prior art, the optical thicknesses of the light-absorbing, triggering, and optical spacer layers are preferably selected to provide an interferometrically antireflective condition. The optically effective thickness of the reflecting surface of the substrate or its reflective layer should also be taken into account, as is known in the art. The optically effective thickness of the triggering layer depends upon whether it is transparent, translucent, or semi-opaque.

For use with laser diodes having wavelengths within the range of 700-900 nm, typical preferred thicknesses are:

light absorbing layer: 3 to 20 nm
triggering layer: 5 to 50 nm
optical spacer layer: 50 to 225 nm The thickness of the triggering layer is preferably at least 10 nm and not more than one-fifth that of optical spacer layer. A thickness of 10 nm should provide sufficient material to generate whatever pressure is necessary to produce either bubbles or pits at desirably high C/N ratios. To keep the energy expenditure at a minimum, thicknesses of 10 to 30 nm are preferred, and 50 nm is considered to be a practical upper limit when the triggering layer is organic, because it is slow to deposit organic materials to greater thicknesses. On the other hand, it is faster to deposit inorganic materials such as silicon dioxide which are preferred for the optical spacer layer.

Materials useful for the triggering layer include hydrocarbon polymers such as poly-methylmethacrylate and polycarbonate, fluorocarbon polymers such as polyvinyl-fluoride, chlorocarbon polymers such as polyvinyl chloride, and organo-metallics such as titanates and silanes such as benzyltrichlorosilane (deposited by spin-coating), hexamethyldisilane (deposited by glow discharge), and octaphenylcyclotetrasilane (e-beam or thermal vapor deposition), preferably in polymerized form. Also useful are dyes such as diethylsquarylium (thermal vapor deposition). Inorganic materials can also be used.

Preferred materials for the light-absorbing layer are chromium and chromium alloys. Other useful materials include other metals such as germanium, cobalt, titanium, and rhodium; organic dyes such as fluorescein as used in U.S. Pat. No. 4,195,313 (Bell); and carbon, carbides, boron, silicon, silicides, and other refractory materials disclosed in European Patent Office application EP58496 (Maffitt et al.).

Preferred materials for the optical spacer layer are $SiO_2$ and $Al_2O_3$ which have been e-beam deposited and provide superior environmental stability. Other inorganic materials which should be useful include oxides, nitrides and fluorides of Al, Ge, Zr, Si, Ti, Ce Ta, La, Cr, Y, Cy, Er, Gd, HF, Sm, Bi, Pb, Zu, Li, Mg, Sb, Pr, and Nd. Highly crosslinked organic polymers which are environmentally stable may also be used.

The invention is especially significant when the substrate of the novel medium is an oxidizable metal reflecting substrate or layer such as copper or aluminum. A metal reflecting layer is conveniently applied by electro-deposition or vacuum deposition and should reflect at least 50% of incident light. When using aluminum, a thickness of at least 50 nm is preferred.

Following a suggestion in "Optical Recording with the Encapsulated Titanium Trilayer" by Bell et al., RCA Review, Vol. 40, Sept. 1979, pages 345-362, the novel quadrilayer DRAW medium may have a protective overcoat over the light-absorbing layer, and there may also be a thermal barrier between the overcoat and the light-absorbing layer.

Figure 1:
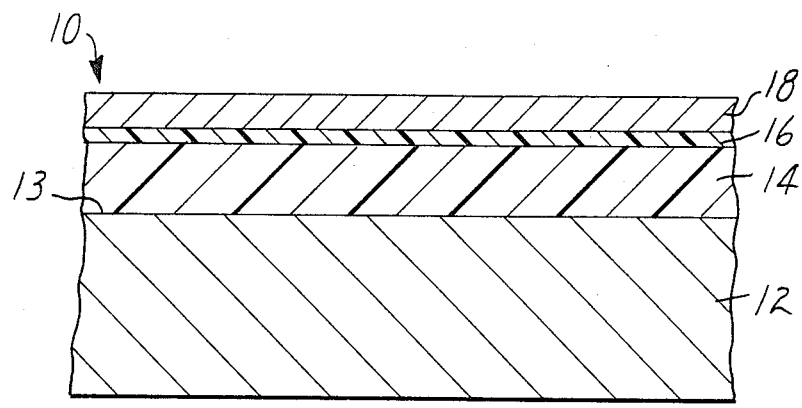
FIG. 1 is a schematic cross-section of a quadrilayer optical DRAW medium of the invention.

The optical recording medium 10 shown in FIG. 1 has a metal substrate 12 which has an optically-flat reflective surface 13 which is covered by an optical spacer layer 14 which in turn is covered by a triggering layer 16 which in turn is covered by a light-absorbing layer 18.

Figure 2:
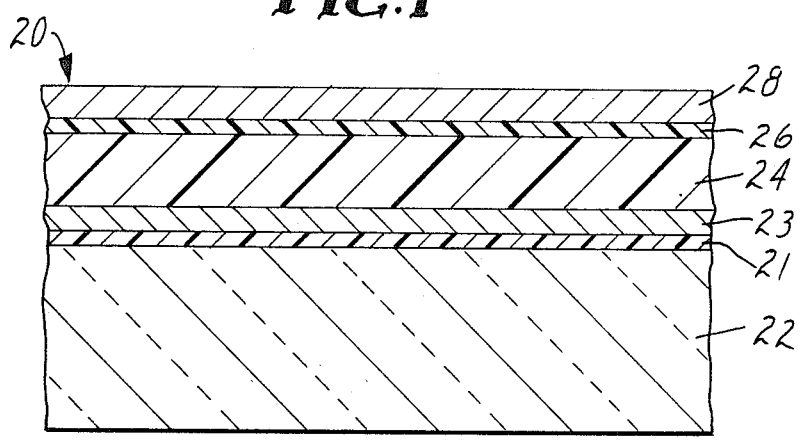
FIG. 2 is a schematic cross-section of another quadrilayer DRAW medium of the invention.

The optical recording medium 20 shown in FIG. 2 has a glass substrate 22, an adhesion-promoting subbing layer 21, a reflecting layer 23, an optical spacer layer 24, a triggering layer 26, and a light-absorbing layer 28.

Figure 3:
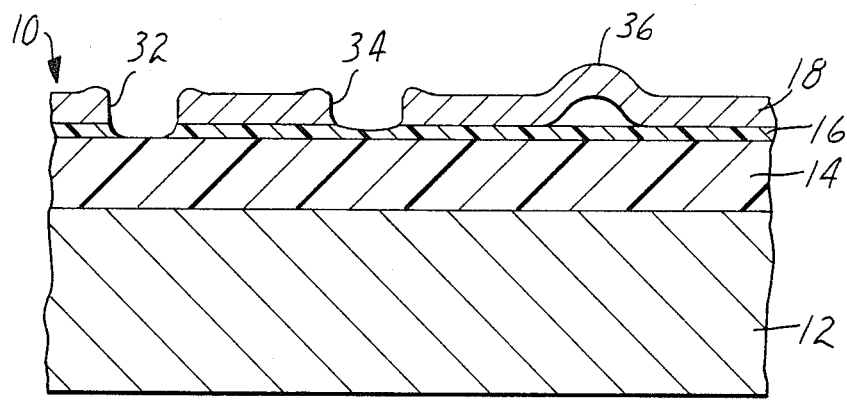
FIG. 3 is a schematic cross-section of the quadrilayer optical DRAW medium of FIG. 1 in which information has been recorded both as pits formed via ablative action and as bubbles or protuberances formed at a lower power level.

FIG. 3 shows the medium 20 of FIG. 1 in which information has been recorded in the form of either pits 32, 34 or bubbles 36. Microscopic examination of a recorded medium does not reveal whether the pits extend into the triggering layer 16 (as does the pit 32) or whether the triggering layer remains intact or partially intact (as shown at the pit 34). Since information is usually recorded at only one power level and duration, a single medium is usually recorded with only pits or bubbles.

The substrates 12 and 22 may be formed of any of a variety of materials such as glass, plastics or metals, preferably a material which is dimensionally stable to minimize radial displacement variations during recording and playback. A preferred material is polymethylmethacrylate, because it is economical and can readily be replicated to provide grooves and format codes on its surface, even though other materials have better dimensional stability. The substrate should have or be provided with an optically-smooth surface, thereby minimizing noise during playback.

MODES FOR CARRYING OUT THE INVENTION

EXAMPLE 1

A quadrilayer optical DRAW medium was prepared using a poly-methylmethacrylate disc having a diameter of 30 cm and an optically-smooth polymerically-subbed surface. A reflecting layer of aluminum was applied by electron-beam evaporation using a Varian 3118 system including an Airco Temescal CV8 power supply and a STIH-270-2MB four-pocket e-beam gun. Using a beam voltage of about 8.3 kV and a beam current of about 0.3 A, the aluminum was deposited to a thickness of about 100 nm. Background operating pressure was about $10^{-6}$ torr ($1.3 \times 10^{-4}$ Pa), and a deposition rate of about 3 nm/sec was achieved.

Electron-beam evaporation, with a beam voltage of 8.3 kV and a beam current of 0.02 A, was utilized to deposit over the reflection layer an optical spacer layer of $SiO_2$ to a thickness of about 60 nm. Background operating pressure was about $5 \times 10^{-6}$ torr ($6 \times 10^{-4}$ Pa), and a deposition rate of about 0.4 nm/sec. was achieved.

An RF-plasma polymerization unit was utilized to plasma deposit over the optical spacer layer a triggering layer of poly-methylmethacrylate to a thickness of about 17 nm. The monomer feed mixture consisted of about 90 wt. % methylmethacrylate vapor and about 10 wt % acrylic acid vapor. A plasma polymerizing power of about 120 watts was utilized corresponding to a power density of about 0.11 W/cm$^2$. A deposition rate of about 3.5 nm/min. was achieved. Background operating pressure was about $10^{-4}$ torr ($1.3 \times 10^{-2}$ Pa).

Electron-beam evaporation was again utilized, with a beam voltage of about 8.3 kV and a beam current of about 0.03 A, to deposit over the triggering layer a light-absorbing layer of chromium to a thickness of about 5 nm. Background operating pressure was about $10^{-6}$ torr ($1.3 \times 10^{-4}$ Pa) and a deposition rate of about 0.1 nm/sec. was achieved.

Figure 4:
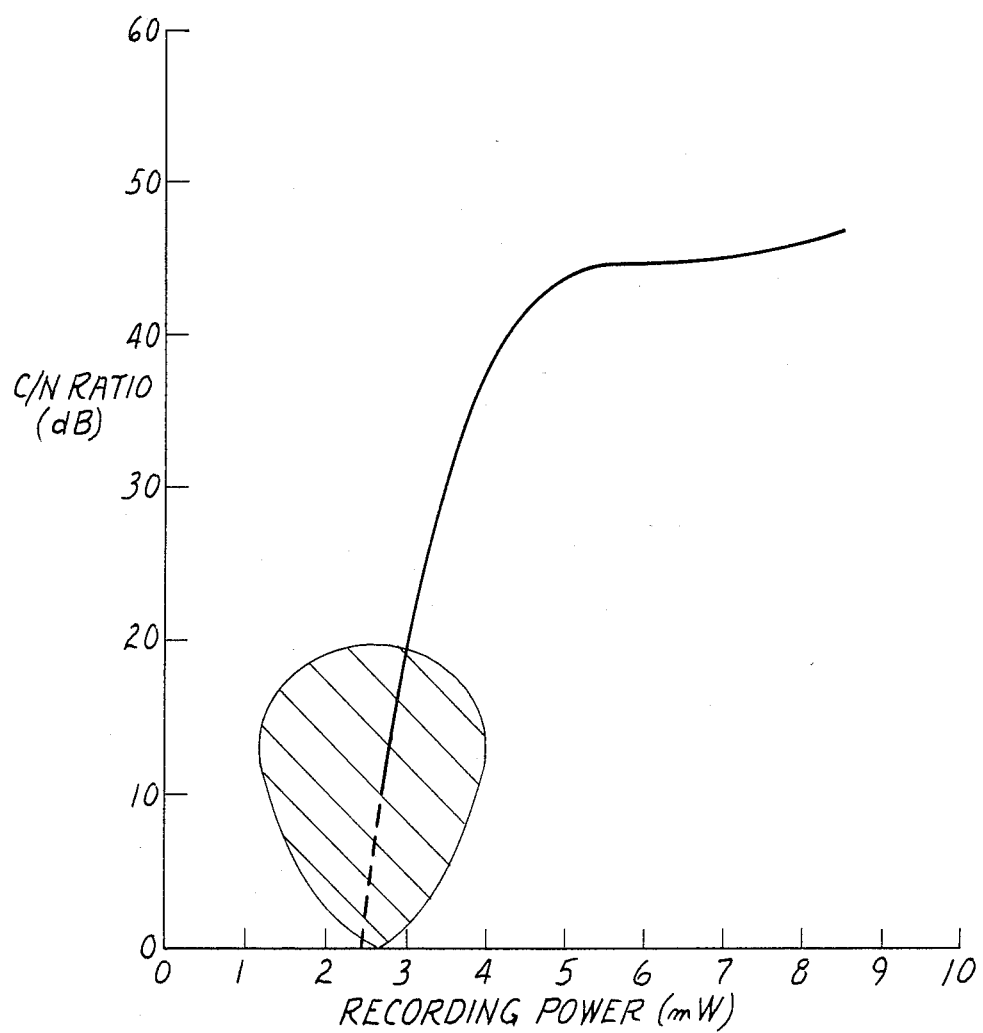
FIG. 4 is a curve showing C/N ratios attained with a quadrilayer optical DRAW medium of the invention at various recording power levels.

Recording experiments were performed on this quadrilayer optical DRAW medium, rotating at 900 rpm, using a laser-diode light source with a 0.6 numerical aperture focusing lens. When a 5-MHz square-wave signal was recorded at a radius of 105 mm using 100-ns pulses, pits were formed in the light-absorbing layer at an incident-light peak power level of 3 mW. FIG. 4 shows C/N ratios attained after recording at various incident-light peak power levels.

Scanning electron microscope examination of the medium recorded at each of 3, 3.5, 4, 5, 6, 7, and 8 mW revealed well-defined openings or pits, the edges of which were very smooth and free from ablation debris.

After the recorded medium had been held for 500 hours at 50° C. and 85% relative humidity, the C/N ratios on playback were retested and were found to be unchanged (within experimental error) from the original values of FIG. 4.

Comparative Example A

A trilayer optical DRAW medium was prepared as in Example 1 except that the triggering layer was omitted and the thickness of the optical spacer layer was increased to about 77 nm to maintain the same interferometrically antireflective condition.

An incident-light peak power level of more than the available 10 mW would have been required to obtain the same C/N ratio as was achieved at 3 mW using the Example 1 medium.

EXAMPLE 2

A quadrilayer optical DRAW medium was made as in Example 1 except that the reflecting layer was copper deposited to a thickness of 100 nm. When recorded at an incident-light peak power level of 8 mW, a C/N ratio of over 50 db was obtained on playback.

EXAMPLE 3

A quadrilayer optical DRAW medium was prepared as in Example 1 except that the chromium light-absorbing layer was deposited to a thickness of about 15 nm. Bubbles were formed in the light-absorbing layer at an incident-light peak power from 2.5 to 3.5 mW, and pits were formed when the power level was beyond 3.5 mW.

EXAMPLE 4

A quadrilayer optical DRAW medium was prepared as in Example 1 except that the substrate was a small piece of polymerically subbed poly-methylmethacrylate and the optical spacer layer was Al$_2$O$_3$ which was e-beam deposited to a thickness of 50 nm. This medium was recorded using 100-ns pulses from a laser-diode light source at an incident light peak power level of 3 mW to form well-defined pits having very smooth edges.

EXAMPLE 5

Another small piece of polymerically subbed poly-methylmethacrylate was converted into a quadrilayer optical DRAW medium by the procedure of Example 1 except that the triggering layer was benzyltrichlorosilane spin-coated at 2000 rpm from a 5% solution in n-butanol to a thickness of 20 nm. This coating was dried at 50° C. for 20 minutes before depositing the chromium light-absorbing layer. When recorded with 50-ns pulses using a laser diode at 3 mW, well-defined pits having smooth edges were formed in the chromium layer.

EXAMPLE 6

A quadrilayer optical DRAW medium was made as in Example 5 except that the triggering layer was tetra-n-butyltitanate spin-coated from a 2% solution in n-butanol to a thickness of 20 nm. When recorded as in Example 5, well-defined pits having smooth edges were formed in the chromium.

I claim:

1. An optical DRAW medium comprising an optically-smooth reflective substrate, an optical spacer layer overlying the reflective substrate, and a light-absorbing layer overlying the optical spacer layer, information being recordable in the form of discrete features in the light-absorbing layer creatable by a focused, modulated laser beam, wherein the improvement comprises: adjacent to each of the light-absorbing and optical spacer layers is a triggering layer formed of an organic material which has a thickness less than that of the optical spacer layer and when heated to a temperature below the melting point of the optical spacer layer rapidly expands to implement or enhance the formation of a bubble or pit in the light-absorbing layer.

2. An optical DRAW medium as defined in claim 1 wherein the organic material has an activation temperature within the range of 200° to 500° C.

3. An optical DRAW medium as defined in claim 2 wherein the organic material is selected from hydrocarbon polymers, fluorocarbon polymers, and chlorocarbon polymers.

4. An optical DRAW medium as defined in claim 1 wherein the triggering layer is a polymeric silane or titanate.

5. An optical DRAW medium as defined in claim 1 wherein the triggering layer is a dye.

6. An optical DRAW medium as defined in claim 1 which is especially adapted to be recorded using a laser diode having a wavelength within the range of 700–900 nm, wherein the light-absorbing layer has a thickness within the range of 3 to 20 nm, the optical spacer layer has a thickness within the range of 50 to 225 nm, and the triggering layer has a thickness within the range of 5 to 50 nm.

7. An optical DRAW medium as defined in claim 6 wherein the thickness of the triggering layer is within the range of 10 to 30 nm.

8. An optical DRAW medium as defined in claim 1 which is reflective by virtue of a reflective layer immediately underlying the optical spacer layer.

9. Quadrilayer optical DRAW medium comprising an optically-smooth, reflective, disk-shaped substrate, an environmentally stable optical spacer layer overlying and in contact with the reflective layer substrate, a triggering layer overlying and in contact with the optical spacer layer, and a light-absorbing layer overlying and in contact with the triggering layer, which triggering layer is formed of an organic material and has a thickness less than that of the optical spacer layer and when heated to a temperature below the melting point of the optical spacer layer rapidly expands to implement or enhance the formation of a bubble or pit in the light-absorbing layer without disturbing the optical spacer layer and its protective function.

10. Quadrilayer optical recording medium as defined in claim 9 having formed in the light-absorbing layer discrete features representing information.

11. Quadrilayer optical recording medium as defined in claim 10 wherein the discrete features are bubbles.

12. Quadrilayer optical recording medium as defined in claim 10 wherein the discrete features are pits.

13. Quadrilayer optical recording medium as defined in claim 9 wherein the triggering layer experiences rapidly increasing vapor pressure when heated to a temperature within the range of 200° to 500° C.

14. Method of making an optical DRAW medium comprising the steps of sequentially depositing onto an optically-smooth reflective substrate an optical spacer layer, a triggering layer, the thickness of which is less than that of the optical spacer layer, and a light-absorbing layer, the triggering layer being formed of an organic material which when heated to a temperature less than the melting point of the optical spacer layer rapidly expands to implement or enhance the formation of a bubble or pit in the light-absorbing layer.

15. Method as defined in claim 14 wherein the substrate is disk-shaped and including the further step of focusing a modulated laser-diode beam on the light-absorbing layer while the substrate is rotated upon its axis, thus creating discrete features representing information.

* * * * *